United States Patent
Park et al.

(10) Patent No.: US 11,270,806 B2
(45) Date of Patent: Mar. 8, 2022

(54) CONNECTOR FOR FASTENING A STEAM GENERATOR TO A FLOW MIXING HEADER IN AN INTEGRAL NUCLEAR REACTOR

(71) Applicants: KOREA ATOMIC ENERGY RESEARCH INSTITUTE, Daejeon (KR); KING ABDULLAH CITY FOR ATOMIC AND RENEWABLE ENERGY, Riyadh (SA)

(72) Inventors: Yunbum Park, Daejeon (KR); Gyumahn Lee, Daejeon (KR); Jongwook Kim, Daejeon (KR); Hanbum Surh, Seoul (KR); Seongmin Chang, Daejeon (KR); Kangheon Lee, Daejeon (KR); Kwanghyun Ahn, Daejeon (KR); Jaeseon Lee, Daejeon (KR); Kyeonghoon Jeong, Daejeon (KR); Jinseok Park, Daejeon (KR); Jaeseung Song, Sejong (KR); Keungkoo Kim, Daejeon (KR)

(73) Assignees: KOREA ATOMIC ENERGY RESEARCH INSTITUTE, Daejeon (KR); KING ABDULLAH CITY FOR ATOMIC AND RENEWABLE ENERGY, Riyadh (SA)

(*) Notice: Subject to any disclaimer, the term of this patent is extended or adjusted under 35 U.S.C. 154(b) by 0 days.

(21) Appl. No.: 16/757,139

(22) PCT Filed: Aug. 30, 2018

(86) PCT No.: PCT/KR2018/010031
§ 371 (c)(1),
(2) Date: Apr. 17, 2020

(87) PCT Pub. No.: WO2019/083148
PCT Pub. Date: May 2, 2019

(65) Prior Publication Data
US 2021/0193342 A1 Jun. 24, 2021

(30) Foreign Application Priority Data
Oct. 26, 2017 (KR) .................. 10-2017-0140375

(51) Int. Cl.
G21C 15/22 (2006.01)
G21D 1/00 (2006.01)
F22B 33/18 (2006.01)
G21C 1/32 (2006.01)

(52) U.S. Cl.
CPC ............ *G21D 1/006* (2013.01); *F22B 33/18* (2013.01); *G21C 1/326* (2013.01); *G21C 15/22* (2013.01)

(58) Field of Classification Search
CPC ........ G21D 1/006; G21C 1/326; G21C 15/22; F22B 33/18
(Continued)

(56) References Cited

U.S. PATENT DOCUMENTS

| | | | |
|---|---|---|---|
| 3,119,746 A * | 1/1964 | Lemesle | G21C 5/10 376/461 |
| 4,684,280 A * | 8/1987 | Dirkin | F16G 15/06 403/79 |
| 2017/0184244 A1* | 6/2017 | Melito | G21D 1/02 |

FOREIGN PATENT DOCUMENTS

| JP | 2014510897 A | 5/2014 |
|---|---|---|
| KR | 101406872 B1 | 6/2014 |

(Continued)

OTHER PUBLICATIONS

International Search Report dated Dec. 17, 2018 issued in PCT/KR2018/010031.

*Primary Examiner* — Jack W Keith
*Assistant Examiner* — Daniel Wasil
(74) *Attorney, Agent, or Firm* — Scully Scott Murphy and Presser (57) ABSTRACT

The present invention relates to a connecting apparatus for a steam generator disposed between a steam generator and a flow mixing header to fasten the steam generator to the
(Continued)

flow mixing header in a sealed manner, and an integral reactor including the same. Fastening the steam generator to the flow mixing header in a sealing manner includes: a base plate mounted on the flow mixing header having a through hole formed at the center thereof; and a steam generator connecting portion protruding along the circumference of the through hole in the base plate allowing an outlet of the steam generator to be inserted and fastened thereto. Since the connection for the steam generator is tightly fastened to the flow mixing header, leakage of a coolant therebetween is prevented, and since the steam generator is horizontally disposed in the flow mixing header, structural stabilization may be achieved.

18 Claims, 7 Drawing Sheets

(58) Field of Classification Search
USPC .......................................................... 376/406
See application file for complete search history.

(56) References Cited

FOREIGN PATENT DOCUMENTS

| KR | 20140084094 A | 7/2014 |
|----|---------------|--------|
| KR | 20150023285 A | 3/2015 |
| KR | 101644937 B1  | 8/2016 |
| KR | 20160123153 A | 10/2016 |

\* cited by examiner

CONNECTOR FOR FASTENING A STEAM GENERATOR TO A FLOW MIXING HEADER IN AN INTEGRAL NUCLEAR REACTOR

CROSS-REFERENCE TO RELATED APPLICATION

Pursuant to 35 U.S.C. § 119(a), this application claims the benefit of the earlier filing date and the right of priority to Korean Patent Applications No. 10-2017-0140375, filed on Oct. 26, 2017, the contents of which are incorporated by reference herein in their entirety.

TECHNICAL FIELD

The present disclosure relates to a connecting apparatus for a steam generator and an integral reactor including the same, and more particularly, to a connecting apparatus for a steam generator disposed between a steam generator and a flow mixing header to fasten the steam generator to the flow mixing header in a sealed manner, and an integral reactor including the same.

BACKGROUND ART

Reactors are divided into loop type reactors and integral reactors (e.g., SMART reactors) depending on a location of main equipment such as steam generators, pressurizers, pumps, and the like. That is, in a loop type reactor, main equipment is installed outside a nuclear reactor, and in an integral reactor, main equipment is installed inside a reactor vessel.

Figure 1:
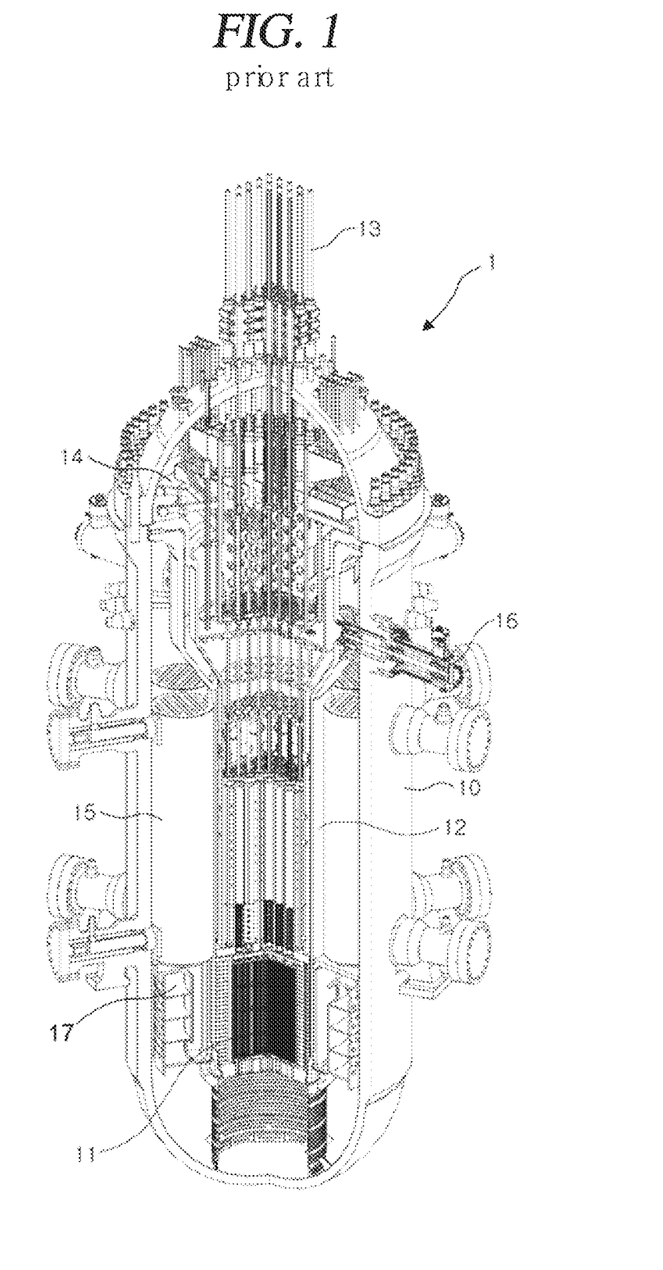
FIG. 1 is a schematic view of a conventional integral reactor.

In detail, as illustrated in FIG. 1, an integral reactor 1 includes a core 11, an internal structure 12, a pressurizer 14, a plurality of steam generators 15, a flow mixing header 17, and the like, are installed inside a reactor vessel 10.

In the integral reactor 1, a flow path is formed by the structure 12 inside the reactor vessel 10, and no separate pipe for connecting the main equipment is required.

In the integral reactor 1, a coolant heated in the core 11 rises to be supplied to the coolant pump 16, and the coolant pump 16 supplies the supplied coolant to an annular cavity of an upper portion of the steam generator 1. The coolant supplied in this manner is cooled by heat exchange while passing through the plurality of steam generators 15 and the coolant that has passed through each of the plurality of steam generators 15 is mixed with each other in the flow mixing header 17 and supplied again to the core 11 side to cool the core 11.

That is, in the integral reactor 1, the plurality of steam generators 15 are arranged in parallel with each other, and the coolant cooled while passing through each of the plurality of steam generators 15 is uniform in temperature through the flow mixing header 17 and then supplied to the core 11.

Here, when each of the plurality of steam generators 15 is connected to the flow mixing header 17, heat loss due to leakage of the coolant at a connection portion between the flow mixing header 17 and the steam generator 15 must be minimized.

Related Art Document (Patent document 1) Korean Patent Registration No. 10-1072823 (Oct. 14, 2011).

DISCLOSURE OF INVENTION

Technical Problem

Therefore, an aspect of the detailed description is to provide a connecting apparatus tightly fastened to a steam generator and a flow mixing header to suppress leakage of a coolant between the steam generator and the flow mixing header.

Solution to Problem

To achieve these and other advantages and in accordance with the purpose of this specification, as embodied and broadly described herein, a connecting apparatus for a steam generator disposed between a steam generator and a flow mixing header and fastening the steam generator to the flow mixing header in a sealing manner includes: a base plate mounted on the flow mixing header and having a through hole formed at the center thereof; and a steam generator connecting portion protruding along the circumference of the through hole in the base plate and allowing an outlet of the steam generator to be inserted and fastened thereto.

To achieve these and other advantages and in accordance with the purpose of this specification, as embodied and broadly described herein, an integral reactor includes: a reactor vessel; an internal structure disposed inside the reactor vessel and dividing the inside of the reactor vessel into an inner space and an outer space to allow a coolant to flow therein; a plurality of steam generators disposed in the outer space of the reactor vessel; a flow mixing header disposed in the outer space of the reactor vessel, allowing the plurality of steam generators to be connected thereto, mixing coolants introduced from the plurality of steam generators, and discharging the mixed coolant; and a connecting apparatus for a steam generator connecting the steam generator and the flow mixing header and suppressing leakage of a coolant from a connection portion between the steam generator and the flow mixing header.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

Advantageous Effects of Invention

As described, since the connecting apparatus for a steam generator and the integral reactor including the same according to the present invention is tightly fastened to the steam generator and the flow mixing header, leakage of the coolant between the steam generator and the flow mixing header may be suppressed.

Also, according to the present invention, when the steam generator is disposed above the flow mixing header, horizontality of the steam generator may be adjusted, achieving structural stabilization.

BRIEF DESCRIPTION OF DRAWINGS

The accompanying drawings, which are included to provide a further understanding of the invention and are incorporated in and constitute a portion of this specification, In the drawings.

MODE FOR THE INVENTION

In order to help understanding of the features of the present invention, a connecting apparatus for a steam generator and an integral reactor including the same according to the embodiment of the present invention will be described in detail.

It should be noted that, in order to facilitate understanding of the embodiments described below, in providing reference numerals to respective components of each of the accompanying drawings, the same components are denoted by the same reference numerals although the same components are displayed in different drawings. Also, in describing the present invention, if a detailed description of known functions or components associated with the present invention unnecessarily obscures the gist of the present invention, the detailed description will be omitted.

Hereinafter, a specific embodiment of the present invention will be described with reference to the accompanying drawings.

Figure 2:
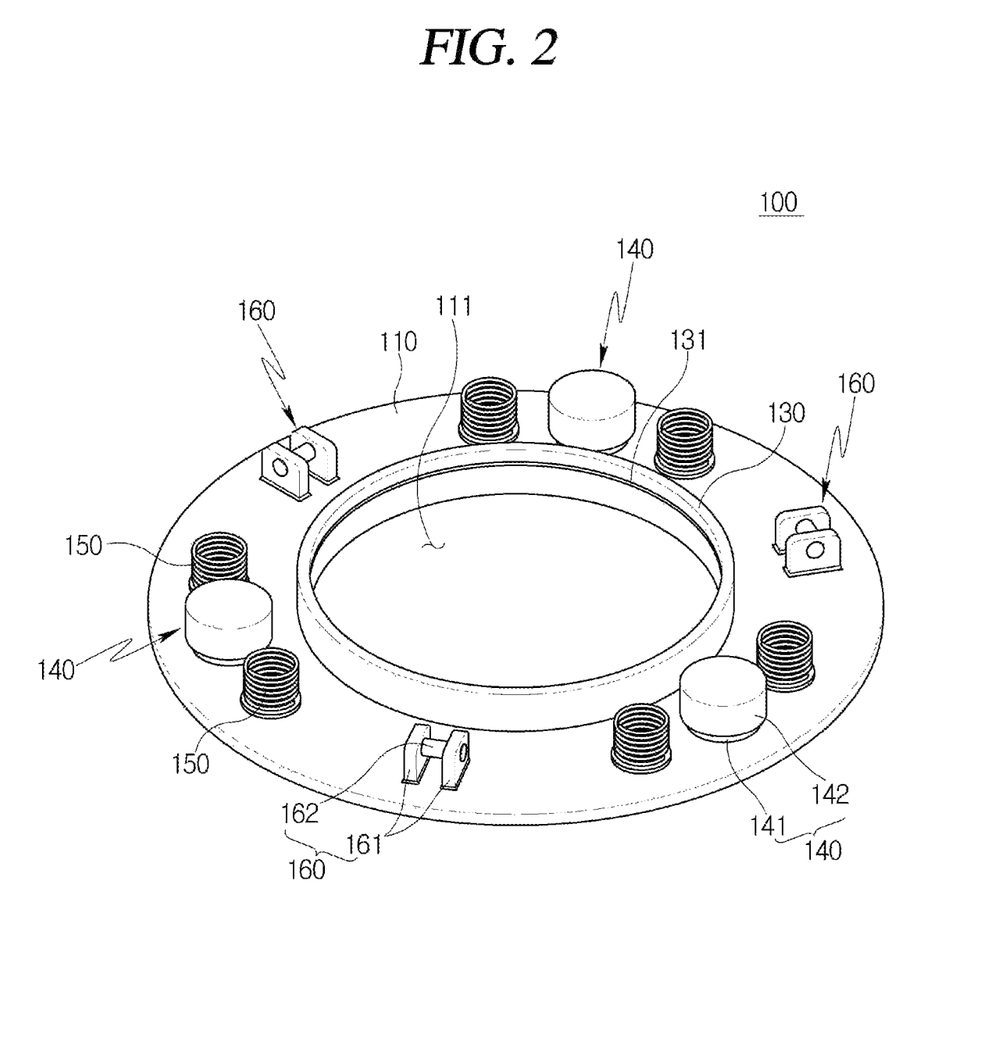
FIG. 2 is a perspective view schematically illustrating a connecting apparatus for a steam generator according to an embodiment of the present invention.
Figure 3:
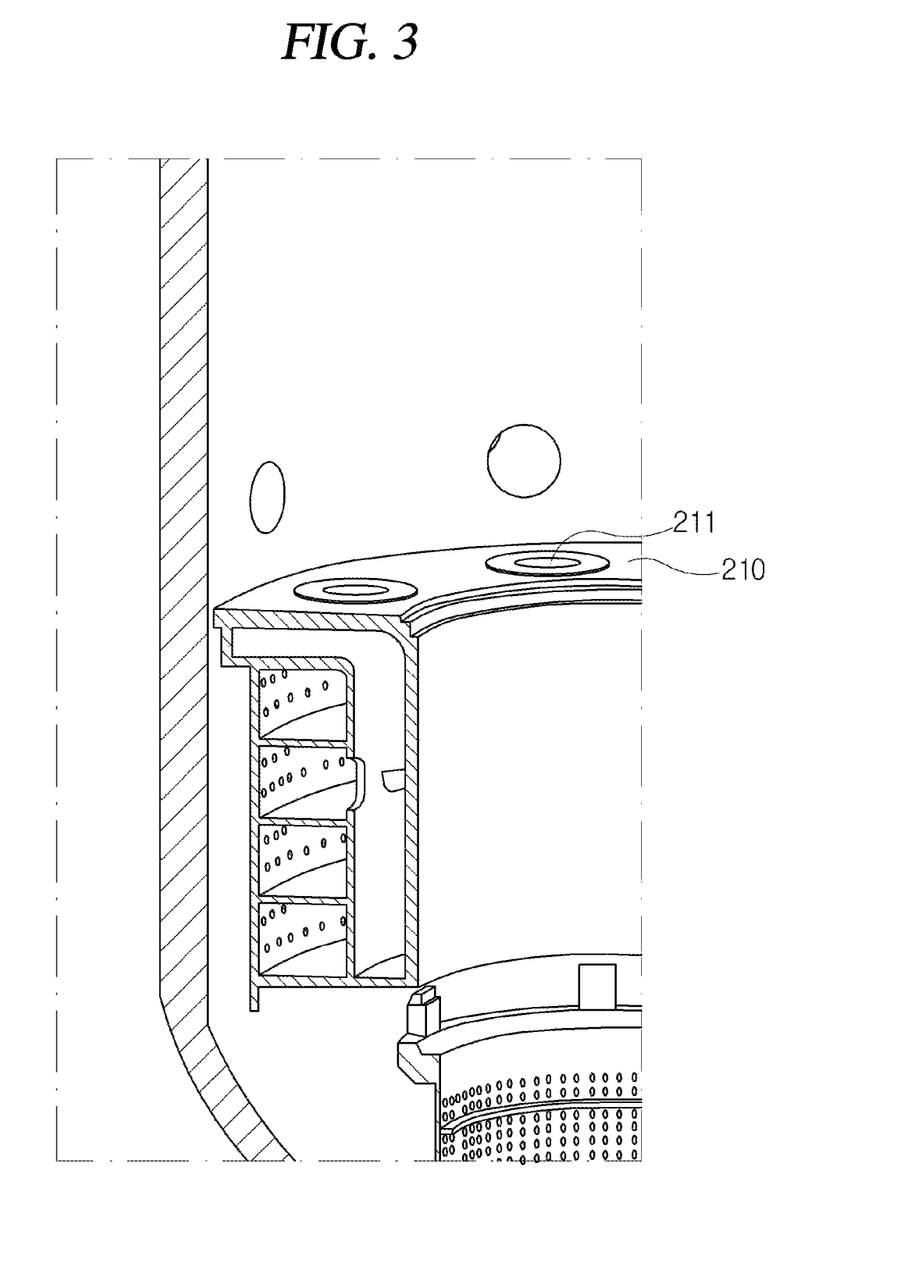
FIG. 3 is a schematic view illustrating a flow mixing header to which a connecting apparatus for a steam generator according to an embodiment of the present invention is fastened.
Figure 4:
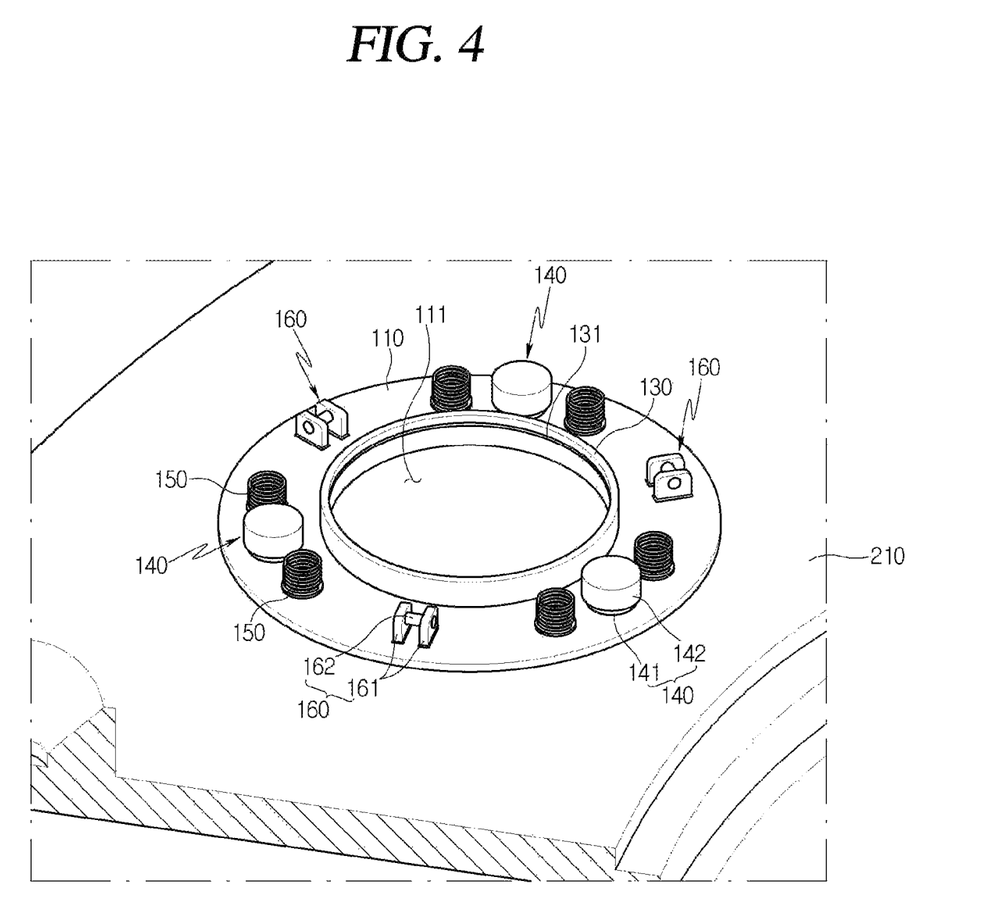
FIG. 4 is a schematic view illustrating a state in which a connecting apparatus for a steam generator according to an embodiment of the present invention is placed in a flow mixing header.
Figure 5:
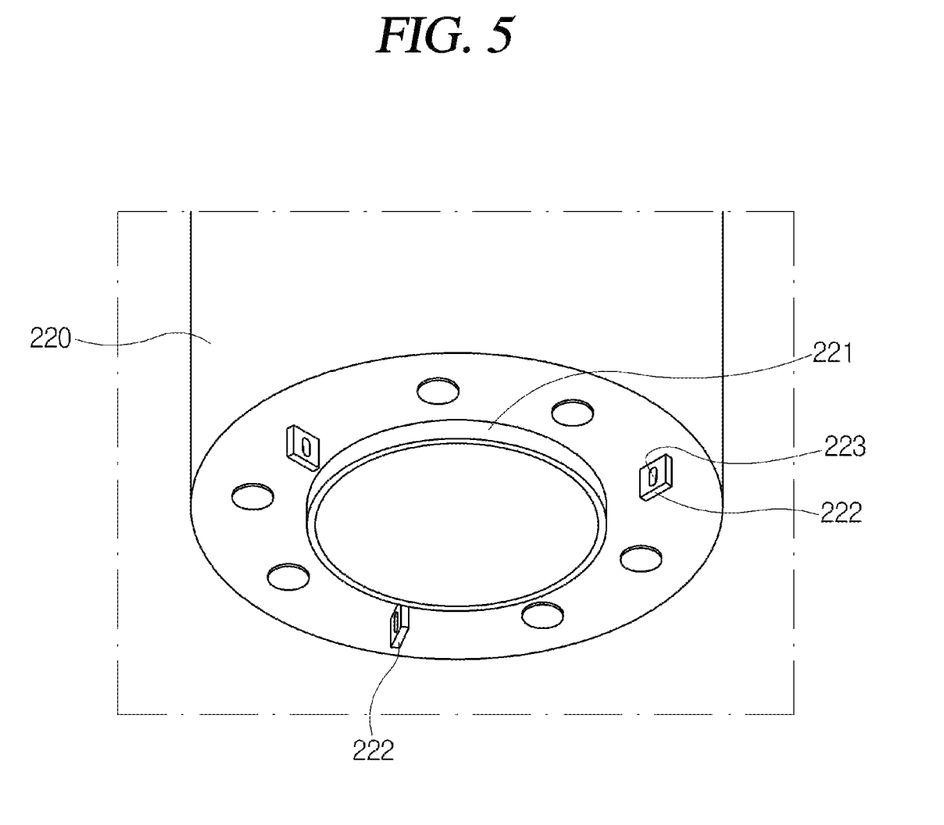
FIG. 5 is a schematic view illustrating a steam generator to which a connecting apparatus for a steam generator according to an embodiment of the present invention is fastened.
Figure 6:
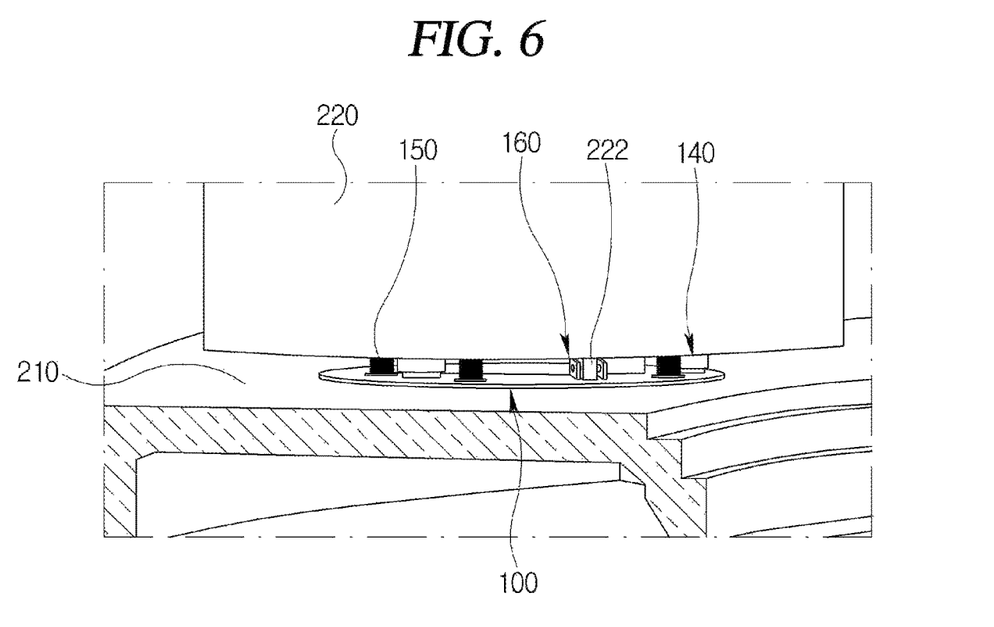
FIG. 6 is a perspective view schematically illustrating a state in which a steam generator, to which a connecting apparatus for a steam generator according to an embodiment of the present invention is fastened, is disposed in an upper portion of a flow mixing header.
Figure 7:
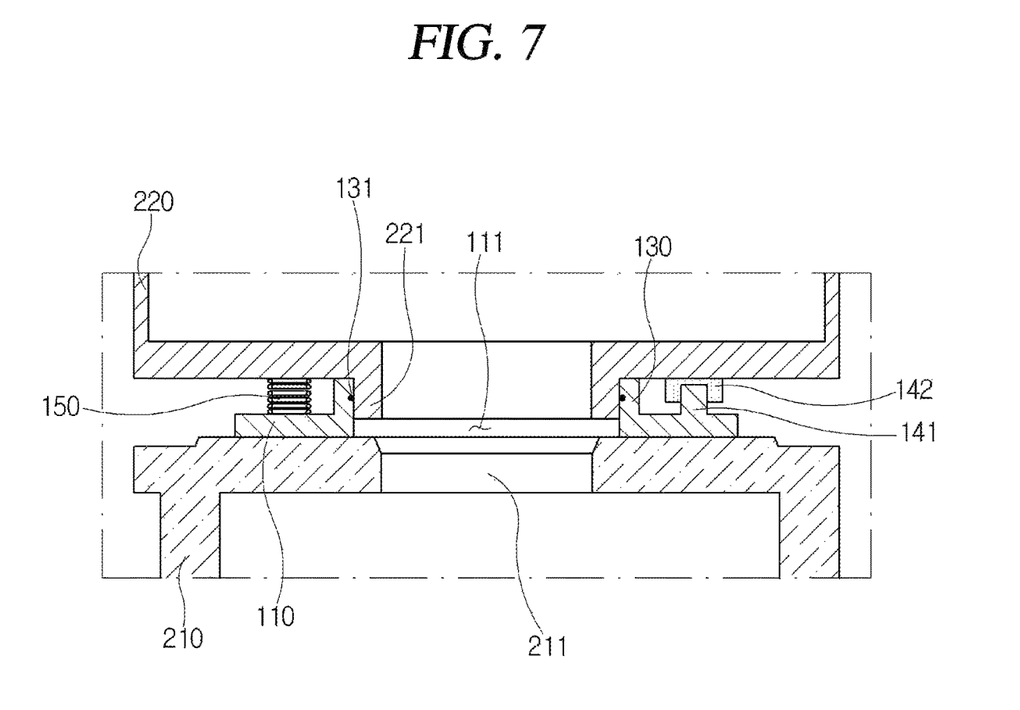
FIG. 7 is a cross-sectional view schematically illustrating a state in which a steam generator, to which a connecting apparatus for a steam generator according to an embodiment of the present invention is fastened, is disposed in an upper portion of a flow mixing header.

FIG. 2 is a perspective view schematically illustrating a connecting apparatus for a steam generator according to an embodiment of the present invention. FIG. 3 is a schematic view illustrating a flow mixing header to which a connecting apparatus for a steam generator according to an embodiment of the present invention is fastened, FIG. 4 is a schematic view illustrating a state in which a connecting apparatus for a steam generator according to an embodiment of the present invention is placed in a flow mixing header, and FIG. 5 is a schematic view illustrating a steam generator to which a connecting apparatus for a steam generator according to an embodiment of the present invention is fastened. FIGS. 6 and 7 are a perspective view and a cross-sectional view schematically illustrating a state in which a steam generator, to which a connecting apparatus for a steam generator according to an embodiment of the present invention is fastened, is disposed in an upper portion of a flow mixing header.

Referring to FIGS. 2 to 7, a connecting apparatus 100 for a steam generator according to an embodiment of the present invention includes a base plate 110 disposed at an upper portion of a flow mixing header 210 and having a through hole 111 at a center thereof and a steam generator connecting portion 130 protruding from the base plate 110 along the circumference of the through hole 111 and having an outlet 221 of the steam generator 220 inserted therein.

The base plate 110 is provided in a disc shape and the through hole 111 is formed at the center so that a coolant discharged from the steam generator 220 flows into the flow mixing header 210. That is, the through hole 111 serves as a flow path connecting the outlet 221 of the steam generator 220 and an inlet 211 of the flow mixing header 210.

Of course, the base plate 110 is not limited to the disc shape but may be formed in a polygonal shape.

The steam generator connecting portion 130 protrudes from the base plate 110 along the circumference of the through hole 111 and the outlet 221 of the steam generator 220 is inserted and fastened thereto That is, the steam generator connecting portion 130 may be provided such that the outlet 221 of the steam generator 220 is inserted into the connecting portion 130 to allow the outlet 221 of the steam generator 220 and the through hole 111 to communicate with each other to form a flow path through which the coolant flows.

A steam generator sealing member 131 may further be provided in order to prevent leakage of the coolant to between the steam generator connecting portion 130 and the outlet 221 of the steam generator 220. That is, the steam generator sealing member 131 is provided in an O-ring shape and is disposed on an inner circumferential surface of the steam generator connecting portion 130, and when the outlet 221 of the steam generator 220 is inserted into the steam generator connecting portion 130, the steam generator sealing member 131 may be closely sealed to the steam generator connecting portion 130 and the outlet 221 and sealed.

The connecting apparatus 100 for a steam generator according to the embodiment of the present invention may further include a horizontality adjusting portion 140 provided to adjust horizontality of the steam generator 220, an elastic member 220 for elastically supporting the steam generator 220, and an escape preventing portion 160 connected to the steam generator 220.

The horizontality adjusting portion 140 is disposed radially from the other side of the base plate 110 along the circumference of the steam generator connecting portion 130, provided in plurality to partially support a lower surface of the steam generator 220, and adjust horizontality of the steam generator 220 by adjusting a height of each portion.

Since the steam generator 220 is manufactured to have a relatively high load, the steam generator 220 may be adjusted to be disposed horizontally on the flow mixing header 210 through the horizontality adjusting portion 140 to prevent deformation of the connecting apparatus 100 for a steam generator.

To this end, the horizontality adjusting portion 140 includes a support protrusion 141 formed to protrude outward from the base plate 110 and threaded on an outer circumferential surface of the support protrusion 141 and a height adjusting member 142 fastened to the support protrusion 141 by a screw and moving in a vertical direction according to a rotation movement to adjust a height of the steam generator 220. That is, when the height adjusting member 142 is rotated by screwing, the steam generator 220 is moved in the vertical direction, so that horizontality of the steam generator 220 may be adjusted.

For example, as illustrated in FIG. 4, when three height adjusting members 142 are radially disposed on the base plate 110 so as to have an angle of 120°, the lower side of the steam generator 220 is supported at three points. Here, horizontality of the steam generator 220 may be adjusted by rotating each of the height adjusting members 142. Of course, only three height adjusting members 142 are illustrated in the drawing, but four or more height adjusting members 142 may be provided as necessary.

In order to rotate the height adjusting member 142 more easily, the height adjusting member 142 may have an irregular portion on an outer circumferential surface thereof, although not illustrated in the drawing. Alternatively, the height adjusting member 142 may be provided as a polygonal column and rotated using a tool such as a spanner. Alternatively, an electronic control device such as a motor or an actuator may be provided for more precise control.

The plurality of elastic members 150 are disposed radially from the other side of the base plate 110 along the circumference of the steam generator connecting portion 130 and are pressed against the lower side of the steam generator 220 so as to be elastically deformed. That is, the elastic member 150 is provided as a spring and is compressed to the lower surface of the steam generator 220. For example, as illustrated in FIG. 4, the elastic member 150 may be disposed on both sides of the height adjusting member 142.

When the steam generator 220 is disposed in the flow mixing header 210, the elastic member 150 applies an elastic force to an upper surface of the base plate 110 and the flow mixing header 210 to allow the base plate 110 and the flow mixing header 210 to be tightly attached to each other.

Also, the elastic member 150 applies an elastic force in a direction in which the steam generator 220 is separated from the connecting apparatus 100 for a steam generator in a state where the steam generator 220 fastened to the steam generator connecting portion 130 is separated from the steam generator connecting portion 130 so that it is possible to prevent the steam generator 220 and the connecting apparatus 100 for a steam generator from sticking to each other according to the use thereof for a long period of time. Therefore, the components may be easily separated from each other.

A plurality of escape preventing portions 160 are radially disposed along the circumference of the steam generator connecting portion 130 on the other side of the base plate 110 and are connected to the lower surface of the steam generator 220 so as not to escape from the steam generator 220. Here, it is preferable that the escape preventing portion 160 is connected to the steam generator 220 to have a predetermined clearance.

More specifically, the escape preventing portion 160 includes a pair of support members 161 protruding outwards from the base plate 110 and allowing a fixing protrusion 222 formed in the steam generator 220 to be inserted therebetween and a fastening member 162 inserted into the pair of support members 161 to fastening the fixing protrusion 222 to the pair of support members 161.

For example, the fastening member 162 is provided in the form of a pin, and the support member 161 is formed with a pinhole (not shown) into which the fastening member 162 is inserted. Accordingly, in a state in which the fixing protrusion 222 is inserted into the support member 161, the fastening member 162 is inserted into the pinhole to fasten the fixing protrusion 222 to the support member 161.

Here, the fixing protrusion 222 is formed with a slit 223 in the up and down direction and may have a predetermined clearance in the vertical direction in a state of being fastened to the supporting member 161 by the fastening member 162.

That is, since the steam generator 220 is required to be varied partially in height by the horizontality adjusting portion 140, the slit 223 is formed in the fixing protrusion 222 and fastened to the support member 161 to have a predetermined clearance.

As illustrated in FIG. 7, an inner diameter of the steam generator connecting portion 130 is formed to be larger than a diameter of the through hole 111 so that a step portion 112 is formed between the steam generator connecting portion 130 and the through hole 111 and an end of the outlet 221 of the steam generator 220 is supported at the step portion 112.

The through hole 111 is tapered so that a diameter becomes smaller toward the inlet 211 of the flow mixing header 210 from the steam generator connecting portion 130 side. That is, the through hole 111 is formed so as to be smaller than the inner diameter toward the inlet 211 of the flow mixing header 210 from the steam generator connecting portion 130 side.

Therefore, since the through hole 111 is formed to be larger than an inner diameter of the outlet 221, it is possible to suppress leakage of a coolant that may occur in a gap between the outlet 221 and the inlet 211, and since the through hole 111 is formed to be tapered toward the inlet 211 of the mixing header 210, it may guide the coolant such that the coolant flows easily to the flow mixing header 210.

Through this configuration, leakage of the coolant from a connection portion between the steam generator 220 and the flow mixing header 210 may be prevented by disposing the connecting apparatus 100 for a steam generator according to an embodiment of the present invention between the steam generator 220 and the flow mixing header 210, horizontality of the steam generator 220 may be adjusted on the flow mixing header 210 through the horizontality adjusting portion 140, and since the elastic member 150 tightly attaches the base plate 110 to the upper surface of the flow mixing header 210, the connecting apparatus 100 for a steam generator may be prevented from escaping from the steam generator 220 through the escape preventing portion 160.

Figure 8:
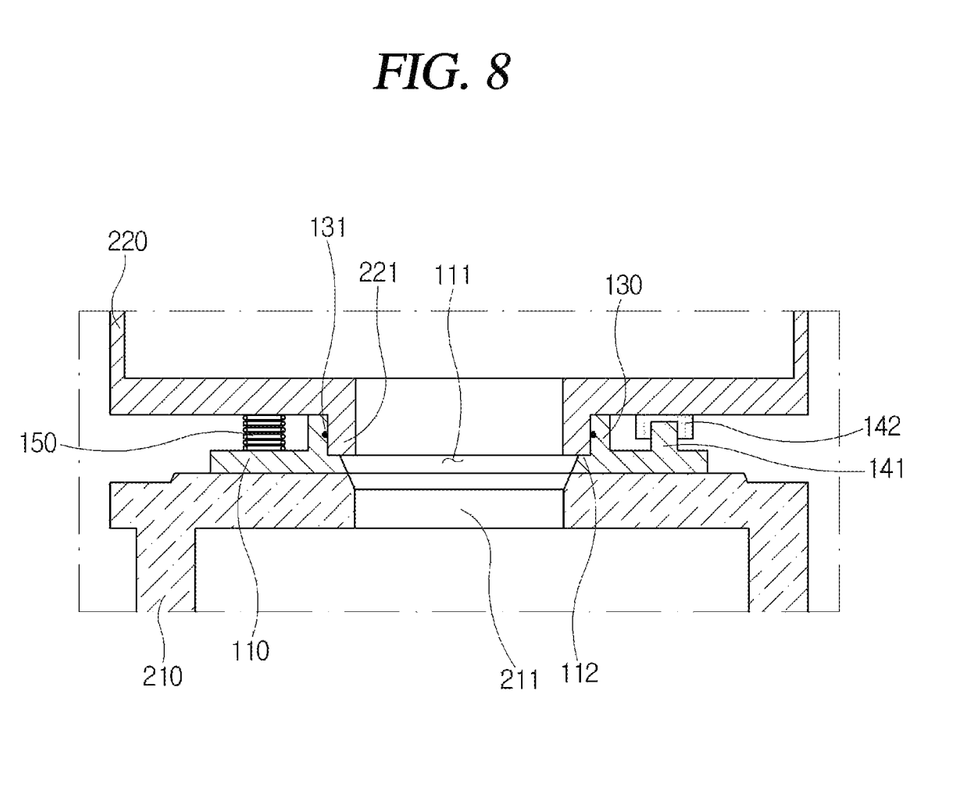
FIG. 8 is a cross-sectional view schematically illustrating a state in which a steam generator, to which a connecting apparatus for a steam generator according to another embodiment of the present invention is fastened, is disposed in an upper portion of a flow mixing header.

FIG. 8 is a cross-sectional view schematically illustrating a state in which a steam generator, to which a connecting apparatus for a steam generator according to another embodiment of the present invention is fastened, is disposed in an upper portion of a flow mixing header.

Referring to FIG. 8, the connecting apparatus for a steam generator according to another embodiment of the present invention has the same configuration as that of the connecting apparatus 100 for a steam generator according to another embodiment of the present invention described above with reference to FIG. 7, except for a portion where a step portion 112 is formed at an inner surface of the steam generator connecting portion 130 and a portion where the through hole 111 is formed to be tapered.

An integral reactor (not shown) according to an embodiment of the present invention includes a reactor vessel, an internal structure disposed inside the reactor vessel and dividing the inside of the reactor vessel into an inner space and an outer space, a plurality of steam generators disposed in the outer space of the reactor vessel, a flow mixing header disposed in the outer space of the reactor vessel, allowing the plurality of steam generators to be connected thereto, mixing coolants introduced from the plurality of steam generators, and discharging the mixed coolant, and a connecting apparatus for a steam generator connecting the steam generator and the flow mixing header and connecting such that a coolant is not leaked from a connection portion between the steam generator and the flow mixing header.

The integral reactor (not shown) according to an embodiment of the present invention may be provided to include the connecting apparatus for a steam generator according to the embodiment of the present invention described with reference to FIGS. 2 to 7. Although the integral reactor according to an embodiment of the present invention is not illustrated, a basic configuration thereof may be referred to the conventional integral reactor disclosed in FIG. 1.

That is, in the integral reactor of the present invention, the plurality of steam generator are arranged radially in parallel and the connecting apparatus 100 for a steam generator is provided at a lower end of each of the steam generators, and the steam generators are disposed at a upper portion of the flow mixing header. Accordingly, leakage of the coolant, which has been heat-exchanged while passing through the steam generators, to the outside may be suppressed and the coolant flows to the flow mixing header, thereby minimizing heat loss due to leakage of the coolant.

While the present invention has been particularly illustrated and described with reference to embodiments thereof, it is to be understood that the invention is not limited to the disclosed embodiments. It will be apparent to those skilled in the art that various changes and modifications may be made without departing from the scope of the appended claims to be described hereinafter.

INDUSTRIAL APPLICABILITY

The present invention is applicable to industries related to steam generators and integral reactors including the same.

The invention claimed is:

1. A connector for fastening a steam generator to a flow mixing header, the connector disposed between a steam generator and a flow mixing header and fastening the steam generator to the flow mixing header in a sealing manner, the connector comprising:
a base plate mounted on the flow mixing header and having a through hole formed at the center thereof;
a steam generator connecting portion protruding along the circumference of the through hole in the base plate and allowing an outlet of the steam generator to be inserted and fastened thereto; and
a plurality of elastic members provided in plurality along the circumference of the steam generator connecting portion on an other surface of the base plate and pressed toward a lower surface of the steam generator to be elastically deformed.

2. The connector of claim 1, further comprising:
a horizontality adjusting portion provided in plurality along the circumference of the steam generator connecting portion on the other surface of the base plate to support a lower surface of the steam generator, and configured to adjust horizontality of the steam generator.

3. The connector of claim 2, wherein
the horizontality adjusting portion includes:
a support protrusion outwardly protruding from the base plate and threaded on an outer circumferential surface thereof; and
a height adjusting member fastened to the support protrusion by a screw and moving in a vertical direction by a rotational movement to adjust a height of the steam generator.

4. The connector of claim 1, further comprising:
an escape preventing portion provided in plurality along the circumference of the steam generator connecting portion on the other surface of the base plate and connected to the lower surface of the steam generator so as not to escape from the steam generator.

5. The connector of claim 4, wherein
the escape preventing portion is connected to the steam generator to have a predetermined clearance.

6. The connector of claim 5, wherein
the escape preventing portion includes: a support member provided as a pair, protruding outwards from the base plate, and allowing a fixing protrusion formed in the steam generator to be inserted therebetween; and
a fastening member inserted into the pair of support members and fastening the fixing protrusion to the pair of support members,
wherein the fixing protrusion has a slit formed in a vertical direction and has a predetermined clearance in a vertical direction in a state of being fastened to the support member by the fastening member.

7. The connector of claim 1, wherein
the steam generator connecting portion further includes: a steam generator sealing member that enables sealing with the outlet of the steam generator.

8. A connector for a steam generator disposed between a steam generator and a flow mixing header and fastening the steam generator to the flow mixing header in a sealing manner, the connector comprising:
a base plate mounted on the flow mixing header and having a through hole formed at the center thereof;
a steam generator connecting portion protruding along the circumference of the through hole in the base plate and allowing an outlet of the steam generator to be inserted and fastened thereto; and
the steam generator connecting portion has an inner diameter greater than a diameter of the through hole to form a step portion with the through hole, and the outlet of the steam generator is supported by the step portion.

9. The connector of claim 8, wherein
the through hole is formed to be tapered to have a diameter reduced toward an inlet of the flow mixing header from the steam generator connecting portion, and a diameter of the steam generator connecting portion is greater than an inner diameter of the outlet of the steam generator.

10. An integral nuclear reactor comprising:
a reactor vessel;
an internal structure disposed inside the reactor vessel and dividing the inside of the reactor vessel into an inner space and an outer space to allow a coolant to flow therein;
a plurality of steam generators disposed in the outer space of the reactor vessel;
a flow mixing header disposed in the outer space of the reactor vessel, allowing the plurality of steam generators to be connected thereto, mixing coolant introduced from the plurality of steam generators, and discharging the mixed coolant; and a connector for a steam generator connecting the steam generator and the flow mixing header and suppressing leakage of a coolant from a connection portion between the steam generator and the flow mixing header, and wherein the connector for the steam generator comprising:

a base plate mounted on the flow mixing header and having a through hole formed at the center thereof; and a steam generator connecting portion protruding along the circumference of the through hole in the base plate and allowing an outlet of the steam generator to be inserted and fastened thereto; and a plurality of elastic members provided along the circumference of the steam generator connecting portion on an other surface of the base plate and pressed toward a lower surface of the steam generator so as to be elastically deformed.

11. The integral nuclear reactor of claim 10, wherein the connecting apparatus further comprising:

a horizontality adjusting portion provided in plurality along the circumference of the steam generator connecting portion on the other surface of the base plate to support a lower surface of the steam generator, and configured to adjust horizontality of the steam generator.

12. The integral nuclear reactor of claim 11, wherein the horizontality adjusting portion includes:

a support protrusion outwardly protruding from the base plate and threaded on an outer circumferential surface thereof; and a height adjusting member fastened to the support protrusion by a screw and moving in a vertical direction by a rotational movement to adjust a height of the steam generator.

13. The integral nuclear reactor of claim 10, wherein the connector, further comprising:

an escape preventing portion provided in plurality along the circumference of the steam generator connecting portion on the other surface of the base plate and connected to the lower surface of the steam generator so as not to escape from the steam generator.

14. The integral nuclear reactor of claim 13, wherein the escape preventing portion is connected to the steam generator to have a predetermined clearance.

15. The integral nuclear reactor of claim 14, wherein the escape preventing portion includes: a support member provided as a pair, protruding outwards from the base plate, and allowing a fixing protrusion formed in the steam generator to be inserted therebetween; and a fastening member inserted into the pair of support members and fastening the fixing protrusion to the pair of support members, wherein the fixing protrusion has a slit formed in a vertical direction and has a predetermined clearance in a vertical direction in a state of being fastened to the support member by the fastening member.

16. The integral nuclear reactor of claim 10, wherein the steam generator connecting portion further includes: a steam generator sealing member that enables sealing with the outlet of the steam generator.

17. An integral nuclear reactor comprising:

a reactor vessel;

an internal structure disposed inside the reactor vessel and dividing the inside of the reactor vessel into an inner space and an outer space to allow a coolant to flow therein;

a plurality of steam generators disposed in the outer space of the reactor vessel;

a flow mixing header disposed in the outer space of the reactor vessel, allowing the plurality of steam generators to be connected thereto, mixing coolant introduced from the plurality of steam generators, and discharging the mixed coolant; and a connector for a steam generator connecting the steam generator and the flow mixing header and suppressing leakage of a coolant from a connection portion between the steam generator and the flow mixing header, and wherein the connector for the steam generator comprises:

a base plate mounted on the flow mixing header and having a through hole formed at the center thereof; and a steam generator connecting portion protruding along the circumference of the through hole in the base plate and allowing an outlet of the steam generator to be inserted and fastened thereto; and wherein the steam generator connecting portion has an inner diameter greater than a diameter of the through hole to form a step portion with the through hole, and the outlet of the steam generator is supported by the step portion.

18. The integral nuclear reactor of claim 17, wherein the through hole is formed to be tapered to have a diameter reduced toward an inlet of the flow mixing header from the steam generator connecting portion, and a diameter of the steam generator connecting portion is greater than an inner diameter of the outlet of the steam generator.

* * * * *